United States Patent [19]
Stumm

[11] Patent Number: 4,926,181
[45] Date of Patent: May 15, 1990

[54] DEPLOYABLE MEMBRANE SHELL REFLECTOR

[76] Inventor: James E. Stumm, 4983 Southcrest, San Diego, Calif. 92110

[21] Appl. No.: 237,160

[22] Filed: Aug. 26, 1988

[51] Int. Cl.[5] ............ G01S 13/90
[52] U.S. Cl. ............ 342/5; 342/10; 343/915; 343/880
[58] Field of Search ............ 350/607, 606; 342/5, 342/10; 343/915, 871, 880–883, DIG. 2, 914; 244/173

[56] References Cited

U.S. PATENT DOCUMENTS

| | | | |
|---|---|---|---|
| 3,165,751 | 1/1965 | Clark | 343/915 |
| 3,568,192 | 3/1971 | Dawson | 342/5 |
| 3,690,080 | 9/1972 | Dillard | 343/DIG. 2 X |
| 4,030,102 | 6/1977 | Kaplan et al. | 343/915 |
| 4,725,025 | 2/1988 | Binge et al. | 244/173 |
| 4,825,599 | 5/1989 | Swann, Jr. | 342/10 X |

*Primary Examiner*—Nelson Moskowitz
*Assistant Examiner*—Tod Swann
*Attorney, Agent, or Firm*—Fulwider, Patton, Lee & Utecht

[57] ABSTRACT

A stowable reflector assembly includes a flexible reflector shell that is rolled into an essentially cylindrical shape and retained by remotely controlled clamps. An underlying folding structure is deployed by remote signal and forms an underlying structure upon which the flexible reflector unrolls. Magnetic strips and auxiliary retaining mechanisms align and retain the reflector on the underlying support and urge it to a position from which it can accurately reflect electromagnetic radiation.

16 Claims, 10 Drawing Sheets 2 of 10

FIG.4
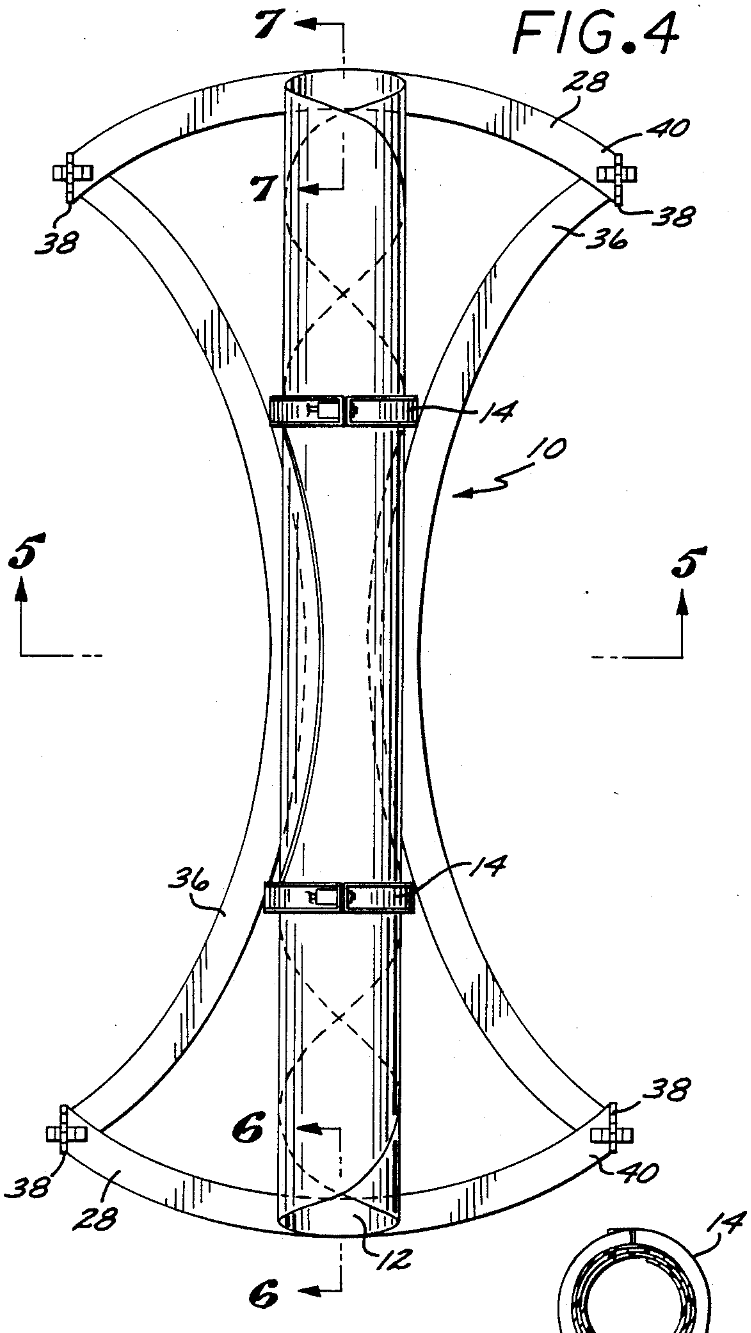
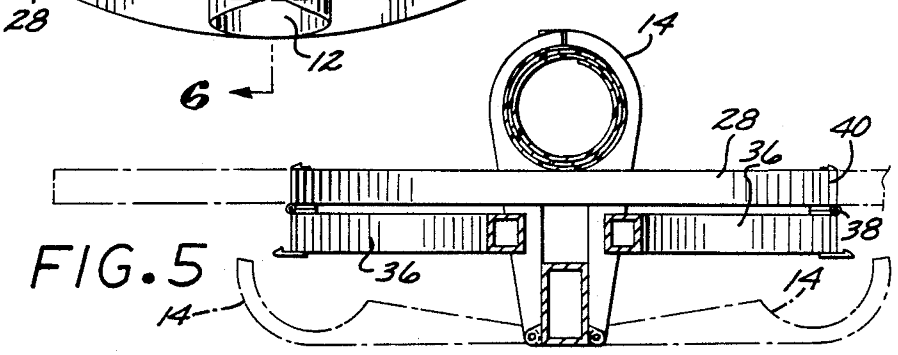
FIG.5

FIG. 8
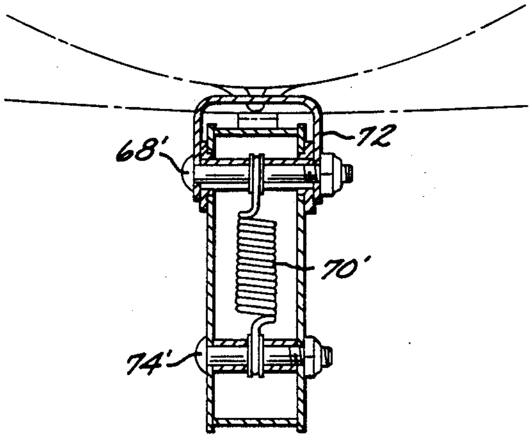
FIG. 9
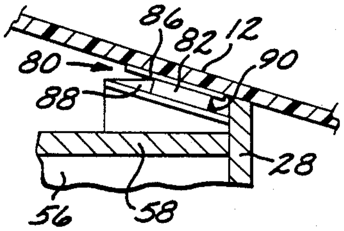
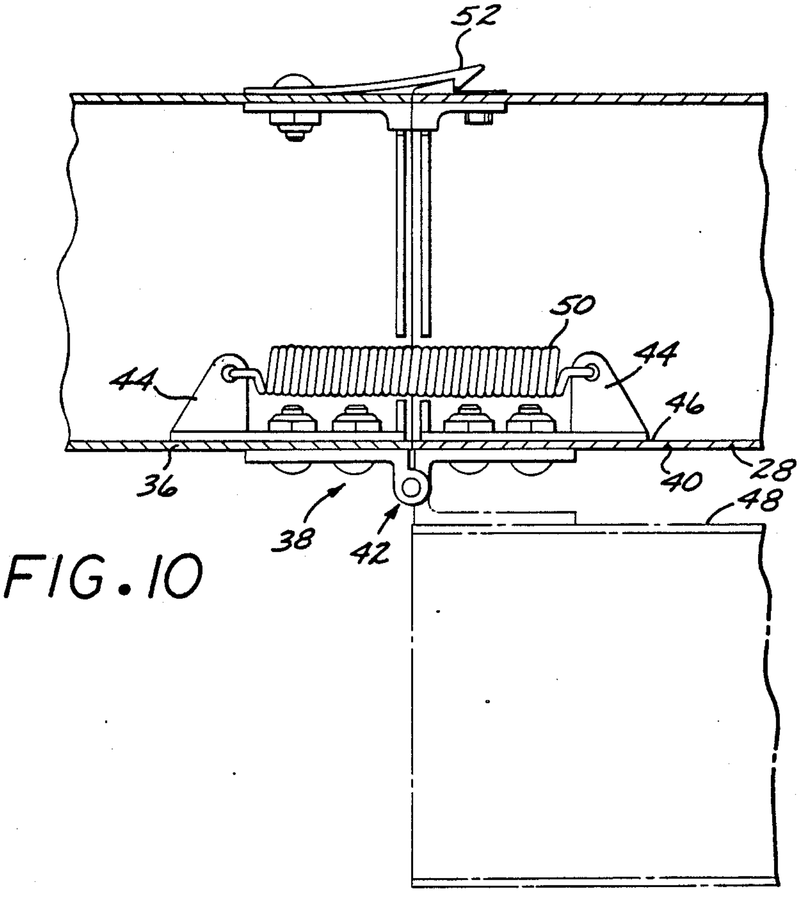
FIG. 10

FIG. 13
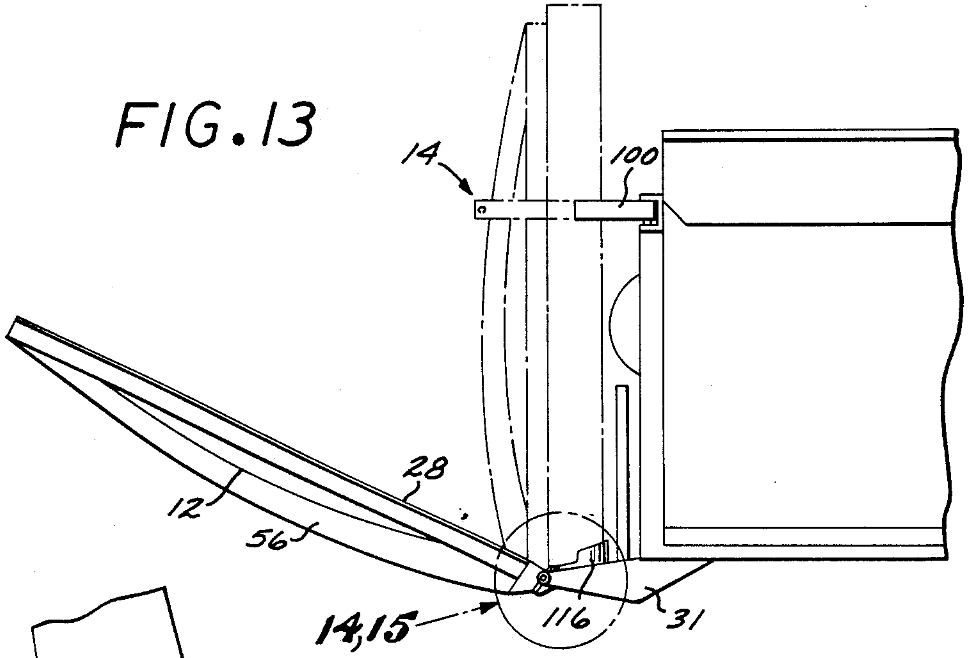
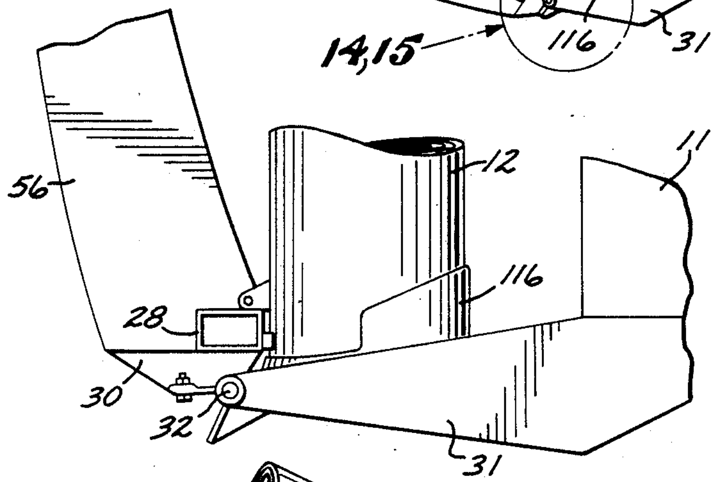
FIG. 14
FIG. 15
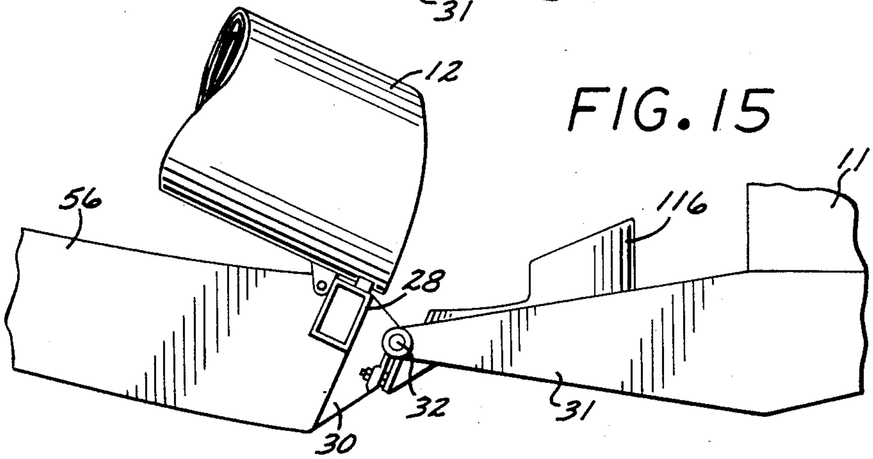

DEPLOYABLE MEMBRANE SHELL REFLECTOR

BACKGROUND OF THE INVENTION

This invention relates to reflectors of the type that are used in combination with an emitter or collector to reflect radio or higher frequency electromagnetic energy and, more specifically, to reflectors used for spacecraft and other applications where the antenna reflector must be stowed in a relatively small package prior to deployment.

Spacecraft reflectors must satisfy a variety of difficult functional requirements, including stowage into a relatively small package during the launch phase, followed by deployment into a configuration suitable for operation in space on a satellite. As frequencies of interest have increased, including the use of such reflectors for light collection, many reflector constructions previously used, such as mesh grids and mechanical structures comprising many individual plates, have not proved suitable for these applications. Reflectors for high frequency radio waves and light collection require very tight control of tolerances on the reflector surface and previous reflector designs have not been capable of providing such tight tolerances while still being stowable into a relatively small package prior to deployment.

Specifically, utilization of microwave frequencies and visible light frequencies for communication systems for satellites and other advanced purposes means that in many cases tolerances on the reflector surface must not exceed plus or minus small fractions of a wavelength in order to prevent distortion of the signals or loss of signal to noise ratio. Previous reflector designs have only been able to achieve these kinds of accuracies with either single piece reflectors or reflectors with articulating panels and complex mechanisms to assure proper alignment of the panels in their deployed positions. Both of these concepts have proved adequate for certain purposes, but they remain extremely limiting in terms of their stowed to deployed envelope ratio and the tradeoffs of mechanical complexity versus accuracy of the deployed surface. Thus, there remains the requirement for a deployable reflector concept with very high surface accuracy and a high deployed to stowed envelope ratio.

SUMMARY OF THE INVENTION

A reflector assembly according to the present invention allows the stowage of the reflector assembly into an envelope much smaller than the deployed envelope. The invention allows deployment of the reflector assembly upon remote command and provides a deployed reflector which displays a highly accurate surface capable of accurate reflection of radio and higher frequency electromagnetic energy. The invention achieves these desirable results without complex mechanical or electromechanical systems, is relatively easily and economically manufactured and is adaptable to a broad range of applications which may effectively utilize electromagnetic wave reflectors. While the present invention is particularly applicable and beneficial to satellite systems, the invention may be used in a broad variety of other systems that utilize high quality reflectors.

An exemplary reflector assembly according to the present invention includes a bendable resilient reflector shell which first is formed into the desired deployed shape for the reflector and thereafter is rolled into a semi-cylindrical stowed configuration and secured in the stowed configuration by releasable retainers attached to an underlying support structure. Upon deployment of the underlying support structure and release of the retainers, the reflector unfolds and reverts to the desired surface contour configuration, assisted by registration of the reflector with the underlying support structure which has a reference edge with a surface contour substantially the same as that of the desired deployed reflector configuration. The underlying support may also be stowed in a collapsed configuration, further reducing the stowed envelope of the reflector.

A retaining assembly is sized to maintain the resilient reflector shell in the stowed configuration, position the reflector shell in partial registration over the support assembly, and release the reflector shell from the stowed configuration upon remote command so that the vertical and longitudinal guide assemblies position the reflector upon the support ring. A magnetic or other registration mechanism is used to maintain the edge of the reflector shell against the edge of the support and assure that the reflector shell reverts to the desired deployed configuration incorporating surface contours appropriate for reflection of the electromagnetic waves of interest.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

FIG. 4 is a top plan view, in enlarged scale, of the two-hinge embodiment of the invention of FIG. 1;

FIG. 5 is a fragmentary sectioned end view, in enlarged scale, taken along the lines 5—5 of FIG. 4;

FIG. 8 is a fragmentary sectioned transverse view, in enlarged scale, taken along the lines 8—8 of FIG. 7;

FIG. 9 is a fragmentary sectioned transverse view, in enlarged scale, taken from the circle in FIG. 6;

FIG. 10 is a fragmentary sectioned transverse view, in enlarged scale, taken along the lines 10—10 of FIG. 1;

FIG. 13 is a side elevational view of the reflector assembly in the deployed configuration combination with an exemplary space vehicle;

FIG. 14 is a fragmentary sectioned side elevational view, in enlarged scale, taken from the circle of FIG. 13;

FIG. 15 is a fragmentary sectioned side elevational view taken from the circle of FIG. 13;

Figure 1:
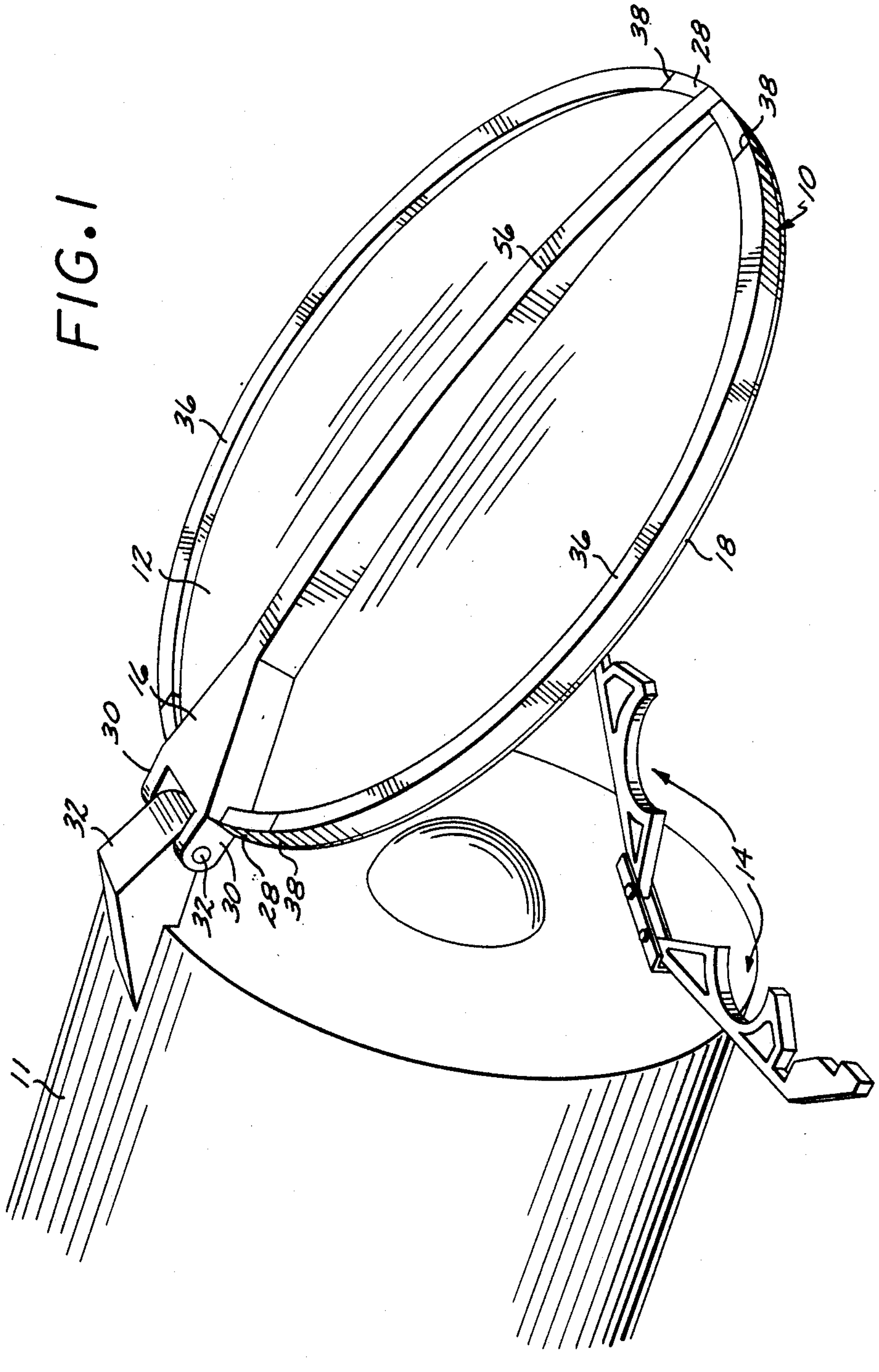
FIG. 1 is a perspective view of the reflector assembly after deployment from an underlying structure on a spacecraft.

While it is generally recognized that use of the higher frequencies of electromagnetic spectrum, including light frequencies, has become desirable for a variety of applications, such use has been limited in spacecraft due to the problems associated with fabricating large aperture deployable reflectors with surface finishes appropriate to those frequencies. The present invention provides a means of providing a deployable reflector of high surface quality that is both relatively easy to manufacture and reliable in operation. The invention relies upon the use of a reflector that is manufactured from a material that displays a very high ratio of inplane to out-of-plane stiffness, thereby allowing the reflector to be rolled up and unrolled without permanent distortion and with a very high deployed to stowed envelope ratio. The reflector, once unrolled, is supported by a deployable support structure that also contains means to index the reflector to the structure. Thus, the support structure and the reflector may both be many times lighter than a single structure required to perform both the reflector and support functions and still be deployable.

DETAILED DESCRIPTION OF THE INVENTION

Referring to the exemplary drawings, the reflector assembly of the present invention, generally designated 10, is mounted to a space vehicle, generally designated 11, for deployment therefrom. The reflector assembly includes a bendable resilient reflector surface or membrane, generally designated 12, which is restrained in a stowed configuration by a retaining or restraining assembly, generally designated 14, for release to a deployed configuration. An underlying support structure, generally designated 16, provides a reference edge 18 having a surface contour substantially the same as the desired deployed reflector surface contour, and serves to provide registration of the reflector upon the support. A guide mechanism, generally designated 20, helps to properly position the reflector upon the support and reference edge. A registration assembly, generally designated 22, is interposed between the support and the bendable reflector to maintain the reflector properly positioned upon the support.

When actuated, the retaining assembly 14 releases the bendable reflector surface 12 from the stowed or rolled configuration. The guide and registration assemblies 20 and 22 juxtapose and align the edge of the reflector surface against the reference edge 18 of the support so that the reflector deploys to exhibit the desired surface contour for reflection of the electromagnetic waves of interest. For the purposes of clarity in this detailed description, the terms longitudinal, transverse, and derivatives thereof, are relative to the plane generally defined by the plane of the aperture of the reflector and support ring assembly.

FIG. 1 generally illustrates the arrangement of a deployed reflector 10 relative to its associated satellite structure 11. Reflector 12 is deployed over underlying support 16 after release from retaining assembly 14. Support structure 16 incorporates a central rib 56 which is contoured to support the reflector 12 in the desired cross section contour for receipt of the electromagnetic waves of interest. Associated with central rib 56 and attached to it is structural ring 28. Structural ring 28 further incorporates wing-like structures 36 that fold at hinges 38 to provide a more compact assembly prior to deployment. Prior to release of the reflector 12 from retaining assembly 14, the reflector is rolled into an essentially cylindrical shape that is held in retaining assembly 14 prior to release. Central rib 56 is rotatably mounted to satellite structure 11 by pivot pin 32, thereby allowing the deployment of the reflector structure away from satellite structure 11 when the reflector 12 is released from retaining structure 14.

Figure 2:
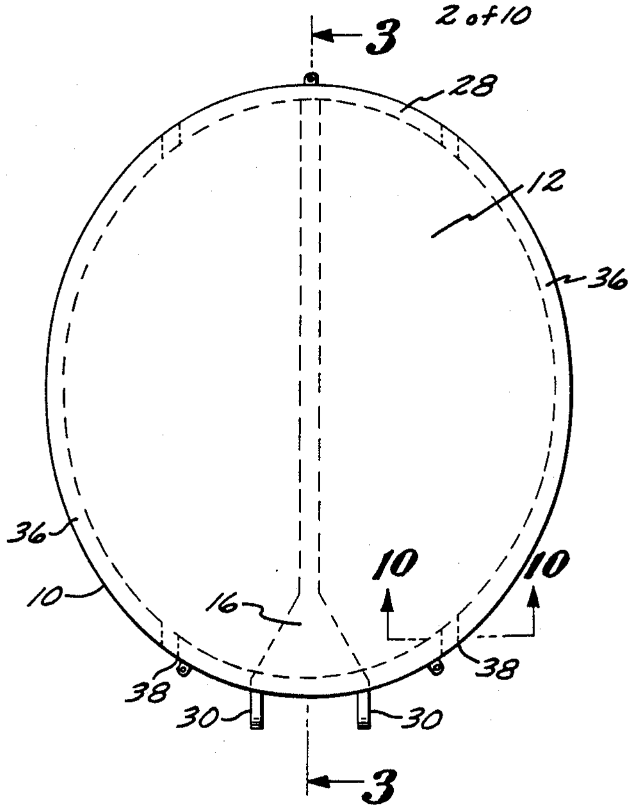
FIG. 2 is a top plan view of the reflector assembly of the present invention.

Referring to FIG. 2, the reflector 12, in one desired deployed configuration, is an offset section of a paraboloid having a minor diameter of about eighty-six inches, a major diameter of about ninety-six inches, a focal length of about sixty inches, and an inner edge displaced about twelve inches from the origin. In the "stowed" configuration, the reflector is rolled into ten inch diameter generally cylindrical shape. The minimal preferred diameter for this size reflector utilizing the construction techniques described below is about ten inches to minimize the stress applied to the reflector shell and limit the permanent set of the surface material during storage. Other sizes and proportions may be accommodated by appropriate changes in the structure and material properties of the reflector.

Ideally, the construction of the reflector shell 12 is one that has relatively low resistance to bending or torsion out of the plane of its contour, but has relatively high resistance to tension or compression loading (stretching or shortening) within the plane of its contour. Such a construction has a very low ratio of bending stiffness to in-plane stiffness, having several orders of magnitude between these parameters. These requirements are satisfied by making the reflector shell out of a very stiff material, but also making it very thin. As a result, a reflector according to this preferred implementation of the invention utilizing construction techniques well known in the spacecraft industry is about ten mils thick and formed of a graphite/epoxy laminate. The reflector is formed in a single piece using techniques developed for large area structural composite sheets. Such techniques utilize moulds upon which the reflector is laid up as layers of graphite epoxy materials that are then cured.

To stow the reflector shell, it is first deformed by pure bending and rolled into whatever appropriate shape it will take without violating the principal that the shell cannot be deformed by in-plane stretching or compression. Theoretically, if tractions (bending forces) are removed from the idealized membrane reflector shell, no permanent deformation will occur, since no force was necessary to bend it in the first place. However, it should be realized that in the real world, some bending energy is involved, and as the reflector is released from the "stowed" configuration, the reflector shell will try to restore itself to its original shape, i.e. the desired deployed configuration for receipt of the desired electromagnetic waves. It will be appreciated that some residual, permanent deformation will be present (residual strain) and that small dissimilarities in properties over the surface will affect the weak direction (out-of-plane bending) in a disproportionate manner. As a result, the shell is placed into its stowed configuration, approximately a semi-cylindrical shape, primarily by bending. Torsion is not beneficial to this process but may be present in the folded shell in the form of a conical semi-cylindrical end condition in the otherwise cylindrical stowed reflector.

To place the shell in a stowed configuration, its ratio of bending stiffness to in-plane stiffness must be very low, e.g. there must be several orders of magnitude between these parameters. The internal energy stored in the reflector shell when it is rolled into the stowed configuration will assist in returning it to the original desired deployed configuration, due to release of the storage tractions. An additional structure, in the form of the guide assembly is used to align the shell to assure proper contact with a reference edge 16, thereby improving the accuracy of the deployed reflector. The relationship between the reference edge configuration and the accuracy of the deployed deflector is discussed in more detail below.

Figure 3:
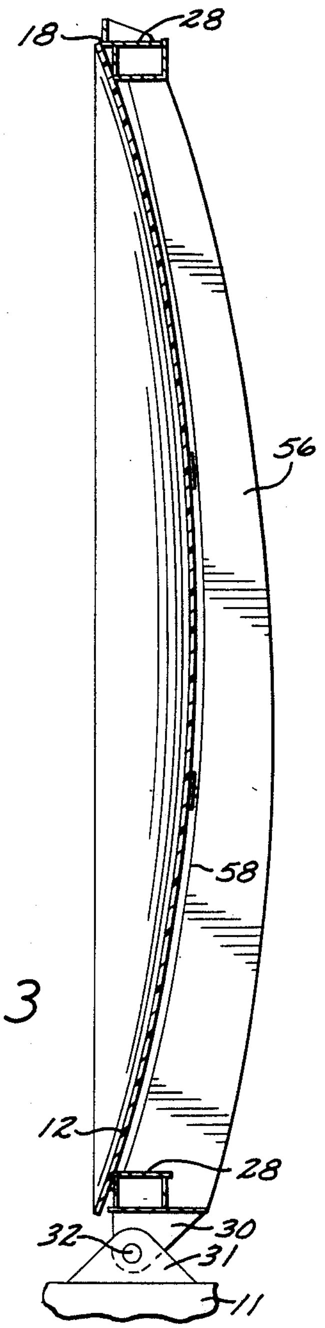
FIG. 3 is a transverse sectional end view, in enlarged scale of the invention, taken along the lines 3—3 of FIG. 2.

FIG. 3 illustrates a cross section of the apparatus of the present invention at 3—3 of FIG. 1, central support rib 56, shown in cross section, supports support ring 28 at the support rib 56 extremity and reflector 12 is supported within support ring 28. A flange 58 is found on rib 56 to provide accurate support of reflector 12 across the length of rib 56. As shown in FIG. 3, in the preferred embodiment illustrated, a support ring 28 having the reference edge 18 formed in the periphery thereof, has a plurality of hinge flanges 30 rotating a pivot pin 32 for pivotal mounting of the reflector assembly 10 to the space vehicle 11. Since it is desirable that the reference edge 18 should match with the edge of the reflector shell, in the embodiment illustrated the support ring has a parabolic elliptical shape with a minor diameter of about eighty-six inches and a major diameter of about ninety-six inches. If differently shaped reflector shells are used, these variations will also be reflected in the specific shape of the support ring and its peripheral reference edge.

The reference edge 18 at the periphery of the support ring 28 is juxtaposed against the reflector shell 12 to register the peripheral edge of the shell against the reference edge 18 that is shaped in the contour of the desired deployed configuration. By this registration, given the absence of other distorting forces, and provided that there are no dimensional changes within the plane of the shell, the reflector shell will automatically deploy from the stowed configuration to the desired deployed configuration.

While in the particular embodiment described, the support ring 28 is in the shape of an elliptical ring, at a minimum, merely a peripheral shell reference surface or edge is required. Note however, that while a continuous reference edge is ideal, a discrete, appropriately spaced reference structure will also perform this function, provided that the spaces between the elements of the reference structure are not so large as to cause significant structural distortion.

A central support rib 56 extends from one portion of the support ring 36 circumference to another, across the support ring 28, from adjacent the hinge flange 30 to a portion of the support ring opposite the hinge flange 30. The support rib extends below the support ring 28, and has a top surface 58 configured substantially identical to the desired deployed reflector shell configuration. A mounting fitting extends from one end of the support rib for pivotally mounting of the support rib and connected support ring to the underlying structure 11. While the particular embodiment depicted in FIGS. 1–3 includes such a rib, a plurality of ribs offset relative to a central major axis of the support ring or a total absence of support ribs could be implemented. Indeed, under some circumstances, internal ribs or reference surfaces may be required to prevent the reflector shell from falling through the support ring upon deployment.

As shown in FIGS. 4 and 5, the support ring 28 is hinged for folding back upon itself to reduce the overall width of the stored reflector assembly 10 to about forty-five inches in the embodiment described. In the two-fold embodiment illustrated, first and second wing portions 36 of the support ring 28 are pivotally mounted by a hinge assembly 38 to a central portion 40. In this configuration, the wings can be reversably moved from a deployed position having the desired peripheral edge configuration to pivot about a substantially longitudinal axis of the reflector shell, e.g. the major diameter of the ellipse, and inwards towards the central portion to fold up against the bottom of the support ring.

FIGS. 6–9 illustrate how, during deployment and expansion of the reflector shell 12 from the stowed configuration to the deployed configuration, the reflector shell is urged and positioned into abutment with the reference edge 18 and the central support rib 56 by the engaged guide assembly 20, including vertical and longitudinal guide assemblies generally designated 70 and 72 respectively.

Figure 6:
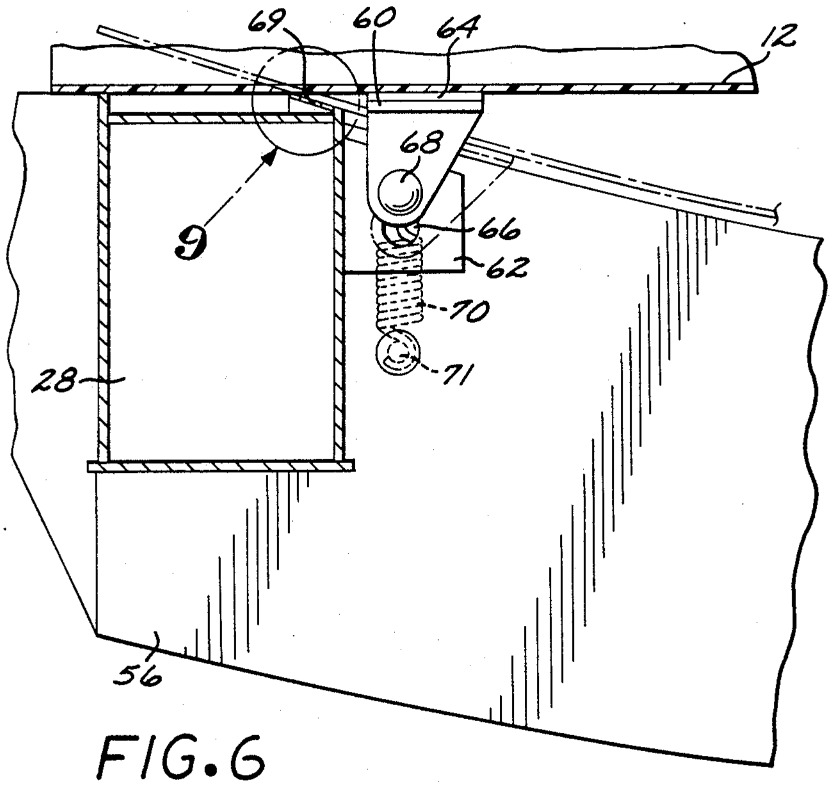
FIG. 6 is a fragmentary sectioned side elevational view, in enlarged scale, taken along the lines 6—6 of FIG. 4.

FIG. 6 illustrates how a vertical engaging guide cam assembly, generally designated 60, allows the reflector shell 12, as it expands into the open parabolic shape, to move vertically relative to the plane of the support ring 28 . The vertical guide 60 retains the reflector shell 12 in the longitudinal and lateral direction. More particularly, the vertical guide includes a vertical guide cam or block 62 mounted along an inside surface of the support ring 28. A generally vertical slot 66 extending through said cam guide in a direction generally downward and parallel to the plane of the support ring aperture, is sized to receive a vertical cam guide hinge pin 68. A top engaging surface 64 of the guide cam, for securing to a portion of the reflector shell, is configured to correspond with the desired reflector shell surface in the deployed configuration. Thus, the top engaging surface 69 has a contour substantially identical with the corresponding portion of the reflector shell.

The reflector shell 12 is attached to the structure by conventional attachment means such as bolts or screws mounted atop the cam block. A biasing spring 70 has one end secured to mounting pin 71, which is aligned and secured to the central support rib 56 or support ring 28, and extends upward to engage the vertical guide cam block pivot pin 68, which slides in slot 66 in guide 62. Biasing spring 70 provides a downward urging of the engaged reflector shell into the deployed configuration. The use of a hinged mounting about the pivot pin enables a slight rotation of the vertical guide cam about a generally transverse axis relative to the top surface of the cam guide. The biasing spring pulls the engaging cam block from an essentially planar first position after being expanded from the rolled or stowed configuration to the generally concave configuration of the desired deployed reflector shell contour, as shown in phantom in FIG. 6, thus maintaining the maximum contact area between the reflector shell and the guide block during the transition from a planar to concave configuration.

Figure 7:
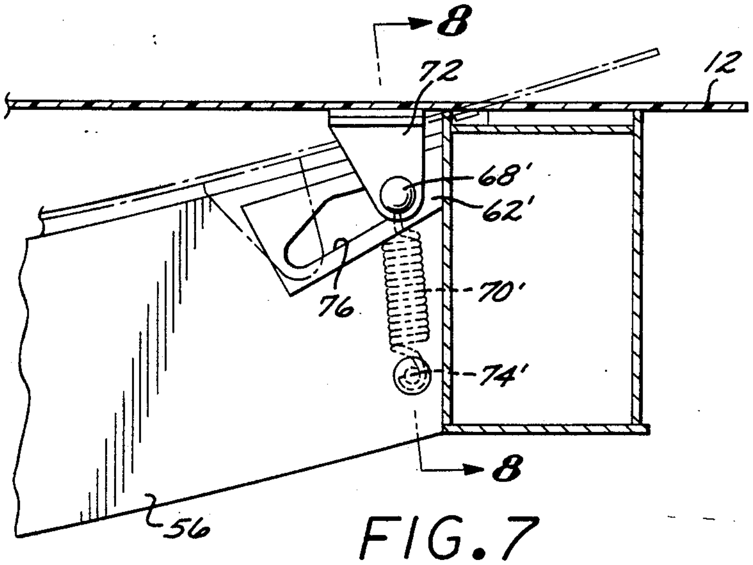
FIG. 7 is a fragmentary sectioned side elevational view, in enlarged scale, taken along the lines 7—7 of FIG. 5.

FIGS. 7 and 8 illustrate how longitudinal guide 72 allows the reflector shell 12 to move longitudinally along the central support rib 56, but retains and positions the reflector shell normal to the rib. This longitudinal movement results from the difference in the distance between the guide pins and mounting pin when the reflector is in its stowed configuration versus when it is in its desired deployed configuration.

FIGS. 7 and 8 also illustrate how longitudinal guide 72 has an aligned longitudinal cam guide pivot pin 68', and mounting pin 74', having a biasing spring member 70, extending therebetween, downwardly urging a longitudinal guide cam or block 72 from a stowed essentially planar configuration to the desired concave deployed configuration. The longitudinal guide cam of the longitudinal guide 72 additionally has a longitudinal slot 76 formed therein which extends transversely there through and downwardly and inwardly relative to the support ring, being configured to enable the longitudinal cam guide to move the reflector shell longitudinally from the planar configuration to the deployed concave configuration. As with the vertical engaging guide cam, the longitudinal guide cam has an engaging surface substantially the same as the desired deployed configuration.

As shown in FIG. 9, upon placement of the reflector shell 12 into the desired position upon the support ring 28, the magnetic registration assembly 80, including magnetic registration strips 82, are interposed between the support ring 28 support surface 58 on central support rib 56 and the bottom surface of the reflector shell 12 for retaining and aligning the reflector shell in the desired position upon the support. More particularly, an insert block 84 is mounted to the top surface of the support ring 28. The insert block is configured so that the top surface is substantially parallel to the desired deployed configuration of the reflector shell 12 and magnetic strip 82. A steel shim 86 0.002 inches thick in the described embodiment, is mounted and positioned upon the bottom surface of the reflector shell. Strip 82 is mounted atop the insert block and is positioned to engage the magnetic strip 86 and retain the strip and thus the reflector shell in the desired position atop the support ring 28. The magnetic register strips 82 may be fabricated of a ferro-magnetic material or powder embedded in a flexible thermal plastic or rubber matrix. Common commercial products using barium-ferrite in thermal-plastic may also be used. End blocks 88 and 90 are positioned adjacent opposite ends of the magnetic register strip to taper the edges of the strip and/or help retain the strips therebetween. Using this configuration, the registration assembly 22 functions to insure that the expanded shell is held in positive contact with and properly positioned relative to the reference structure support 16 and reference edge 18. The light attractive forces produced by this configuration are sized to counteract and remove as-built astigmatism, residual roll-up strain, and light thermal distortion error as earlier described.

FIG. 10 illustrates a cross section of hinge assembly 38 at 10–10 of FIG. 7. As shown in FIG. 10, the hinge assembly 38 includes a plurality of hinges 42 mounted along the bottom of the support ring 28 and has a plurality of spring flanges 44 mounted on a top surface 46 of the support ring opposite the hinge assembly 38 mounted on surface 48 of central portion 40. A coil spring 50 extends from one such spring flange to another to bias the corresponding wing portion 36 and the central portion 40 towards a generally planar configuration. A latch 52 mounted on a top surface of the support ring engages the wing portions and the central portion in a juxtaposed laterally adjacent orientation to assure continuity about the periphery of the support ring once the wings have moved from the stowed configuration into the deployed configuration.

Figure 12:
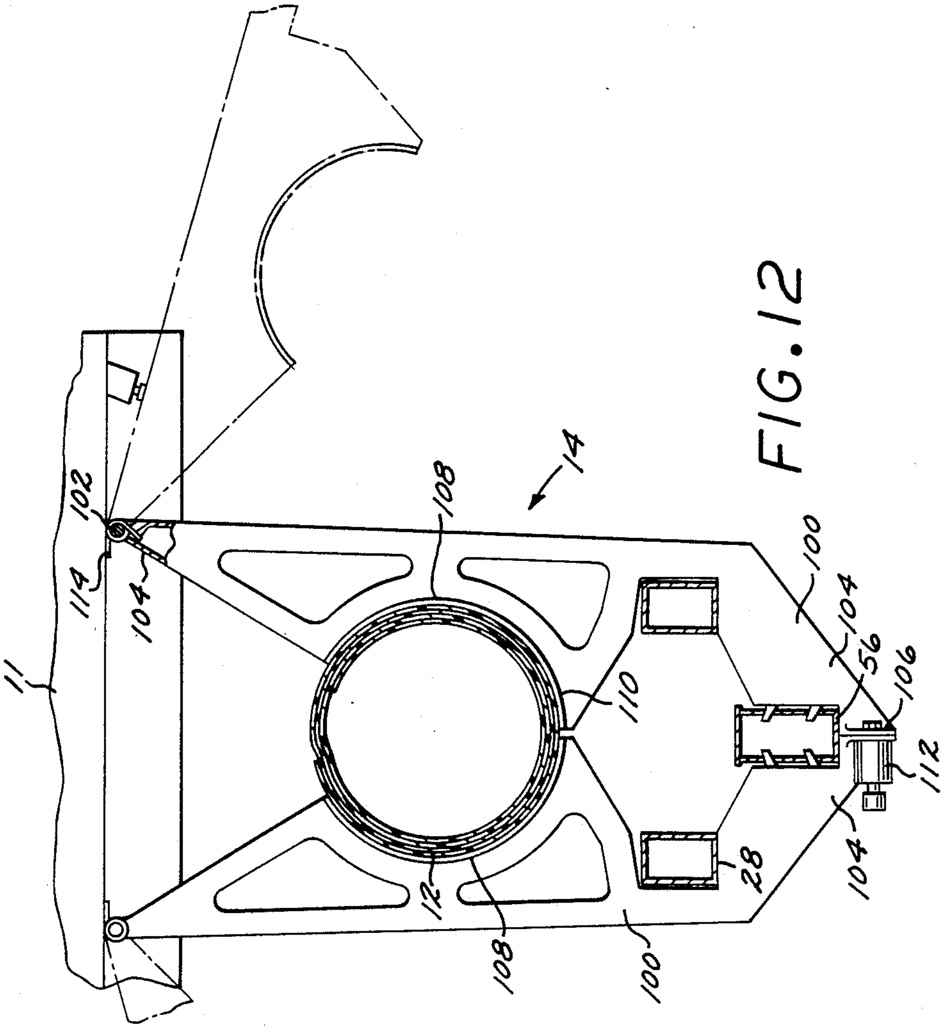
FIG. 12 is a fragmentary, sectioned top plan view, in enlarged scale, taken along the lines 12—12 of FIG. 11.
Figure 11:
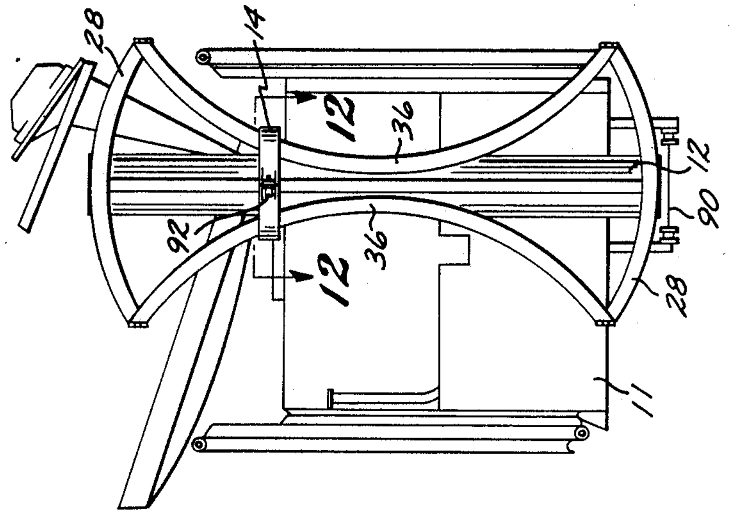
FIG. 11 is a top plan view of the reflector assembly in the stowed configuration in combination with an exemplary space vehicle.
Figure 16:
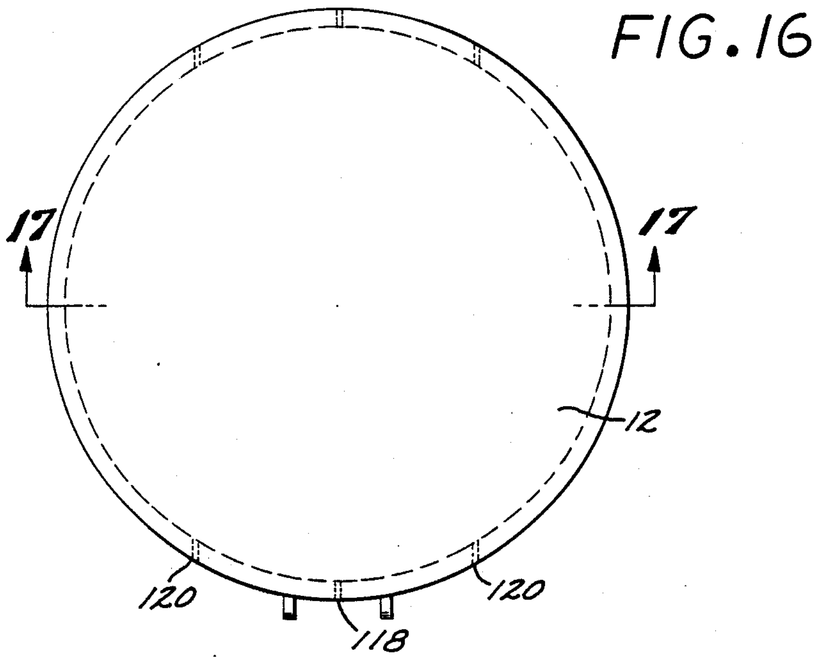
FIG. 16 is a top plan view of another embodiment of the reflector assembly of FIG. 1.
Figure 17:
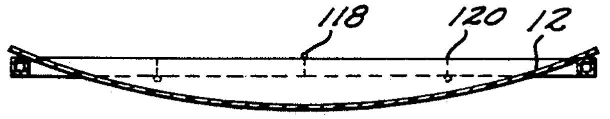
FIG. 17 is a transverse sectional view, taken along the lines 17—17 of FIG. 16.

FIGS. 11–15 generally illustrate the means used to restrain the reflector shell 12 in the stowed configuration just above or adjacent the support ring 28. As shown in FIG. 11, the present invention includes an upper outside retaining assembly 14 and a lower outside retaining assembly 90. Support ring section 28 and support wing sections 36 are located adjacent rolled-up reflector 12. In operation, retaining assembly 14 is released by retaining mechanism 92 and thereafter reflector 12 unrolls and is supported on the support surfaces of support ring section 28 and wing section 36. Referring to FIG. 12, the upper retaining assembly 14 includes a pair of jaws 100 pivotally mounted upon a jaw pivot pin 102 at the proximal end 104 relative to the underlying structure 11 for rotation about a longitudinal axis, e.g. the axis generally parallel to the major diameter of the support ring 28 when in the stowed position, from a closed or stowed position to an open or deployed position. The jaw 100 extends outwards to a distal portion 104 having a separation bolt bore 92 formed therein. The jaws have an inside surface contour 108 distant from the proximal end, which is shaped to retain the reflector shell 12 in the stowed or rolled configuration and while engaging the folded support ring 28 and central support rib 56. More specifically, the jaws have opposite inward facing engaging surfaces 110 with recesses 108 formed therein. The recesses are positioned to define a bore 110 sized to receive the reflector shell 12 in the folded or stowed configuration between the jaws when the jaws are in the closed position. A separation bolt 112 mounted through the separation bolt bore 106 retains the jaws together to releasably engage the reflector shell, support ring and center support rib in the stowed configuration.

When the release of the reflector shell from the stowed configuration is desired, the separation bolt 112 is split by a remotely generated signal which causes the bolt to explode, thereby enabling the jaws 100 to move outward relative to each other from a closed position to an open position indicated in phantom in FIG. 12, and release the engaged reflector shell 12 and support 16. The rolled reflector shell is moved into the desired deployed position by the interaction of the vertical and longitudinal guide assemblies 70 and 72 respectively. Torsion spring assemblies 114 mounted about the pivot pins 102 bias the jaws outward relative each other to release the reflector assembly from the stowed configuration.

As shown in FIGS. 13–15, the reflector shell 12 outside lower support is mounted to project upward from the pivot bracket 31, extending outward from the satellite 11. The lower support includes a generally arcuate member 116 projecting upward from the pivot bracket, configured and sized to receive the reflector shell in the stowed configuration. As a result, when the central support rib 56 folds outward relative to the satellite 11, the reflector shell 12 is pulled from within the lower support 116 and released for deployment and expansion. As best shown in FIG. 13, the present invention is a side-mounted configuration that has the advantage of placing the reflector where it will not interfere with other satellite subsystems should malfunction occur. Also, the reflector shell is unique in that it can be edge-mounted and a simple pivot can be used to deploy it to the operating position. This eliminates the need for complex rotations, mechanisms and long stretch, thereby improving deployment reliability, weight and stiffness of the overall structure. In one preferred form, the focus may conveniently fall near the top deck of the satellite where the feed horn may be located.

Figure 18:
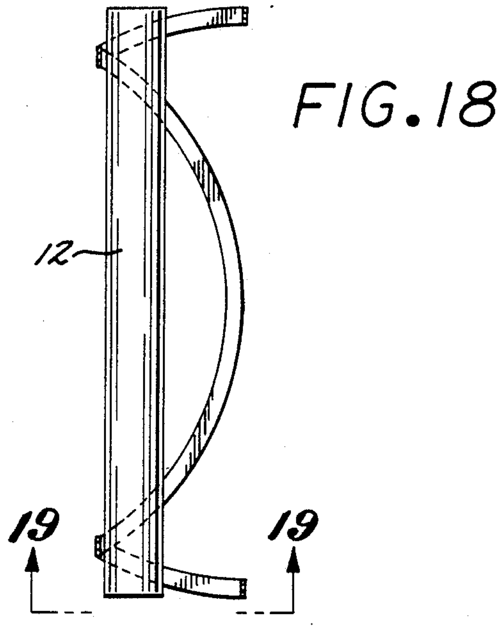
FIG. 18 is a top plan view of the assembly of FIG. 16 in the stowed configuration.
Figure 19:
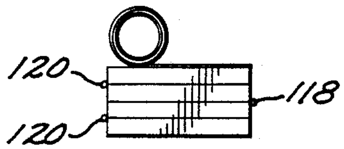
FIG. 19 is a side elevational view taken along the lines 19—19 of FIG.18.

As shown in FIG. 18, alternative embodiments for the particular hinging of the support ring 28 may be used. For example, a three-fold embodiment for stowing the support ring 28, as shown in FIGS. 18 and 19, includes three hinge lines; a central longitudinal hinge line 118 stradled by two wing hinge lines 120. By using this configuration, the stowed support ring configuration may be further reduced in size (compared to the two-fold embodiment) to about twenty-four inches wide when the reflector shell is stowed, as shown in FIG. 18 and 19.

Figure 20:
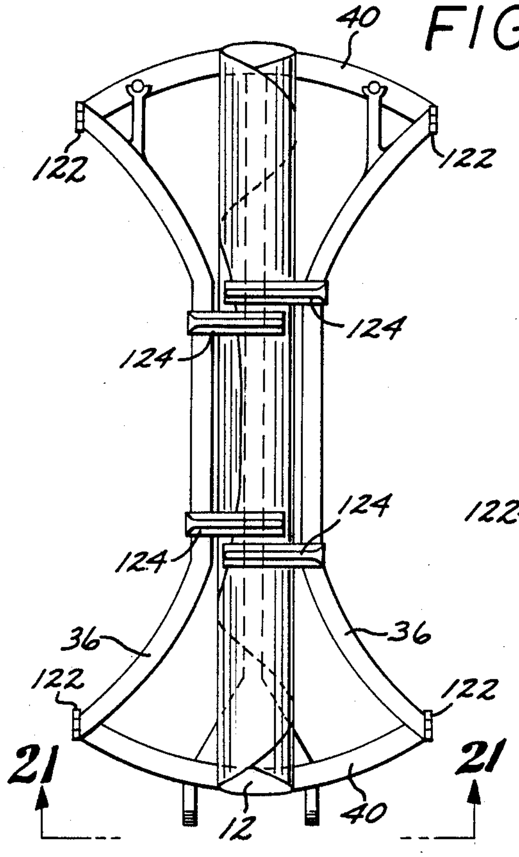
FIG. 20 is top plan view of another embodiment of the reflector assembly of FIG. 1.
Figure 21:
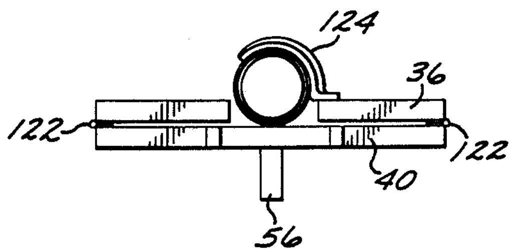
FIG. 21 is a front elevational view, taken along the lines 21—21, of FIG. 20.

FIGS. 20 and 21 show the support ring 28, which incorporates a plurality of hinges 122 pivotally mounted to the wing portions 36, enabling unfolding of the wings from a stowed position atop the central portion 40 to a deployed configuration. When this embodiment is in the stowed configuration, arcuate retaining members 124 project laterally outward and upward from the wing portions 36 and are sized and positioned to retain the reflector shell 12 in a stowed configuration above the support 16. This configuration allows the retainer hooks 124 to restrain the stowed reflector shell 12 above the support ring 28.

Figure 22:
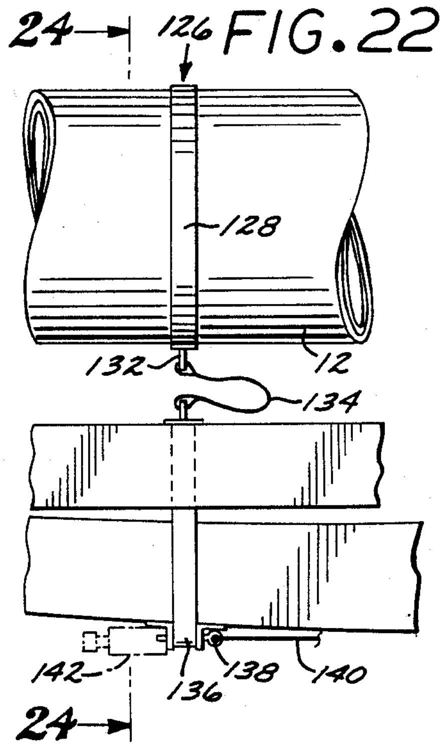
FIG. 22 is a fragmentary side elevational view of the lanyard release mechanism of the present invention.
Figure 23:
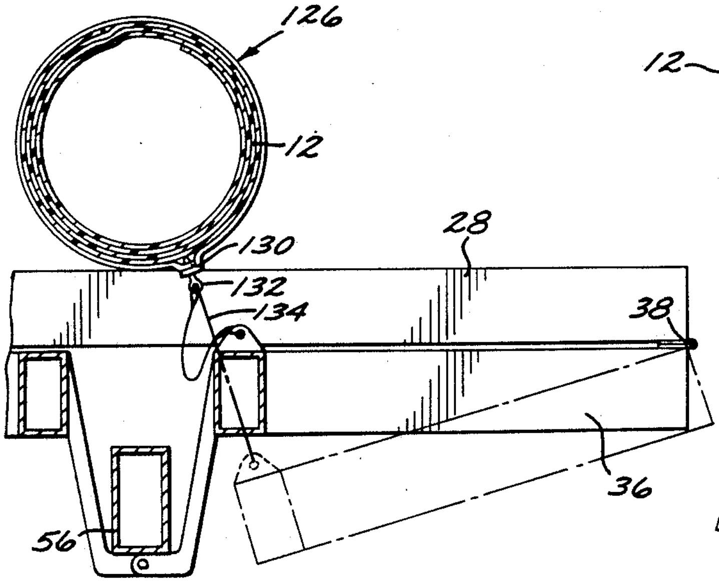
FIG. 23 is a fragmentary front elevational sectional view taken along the lines 24—24 of FIG. 23.

Referring to FIGS. 22 and 23, additional outside retaining members 126 may be provided. A band 128, sized to encircle the rolled reflector shell 12, has an overlapping portion 130. A retaining pin 132, attached by a lanyard 134 secured to the wing portion 36, may be pulled from the band, enabling the release of the band from about the reflector shell. The illustrated embodiment may also include a pair of extensions 136 extending from the wing portions, which are releasably joined together and engaged by a release pin 138 by lanyard 140. Mechanical withdrawal of the release pin 144, or by optional electrically operated pin-puller 142, allows the wing portion to move downward as shown in phantom, to pull the lanyard 134 as described above.

Figure 24:
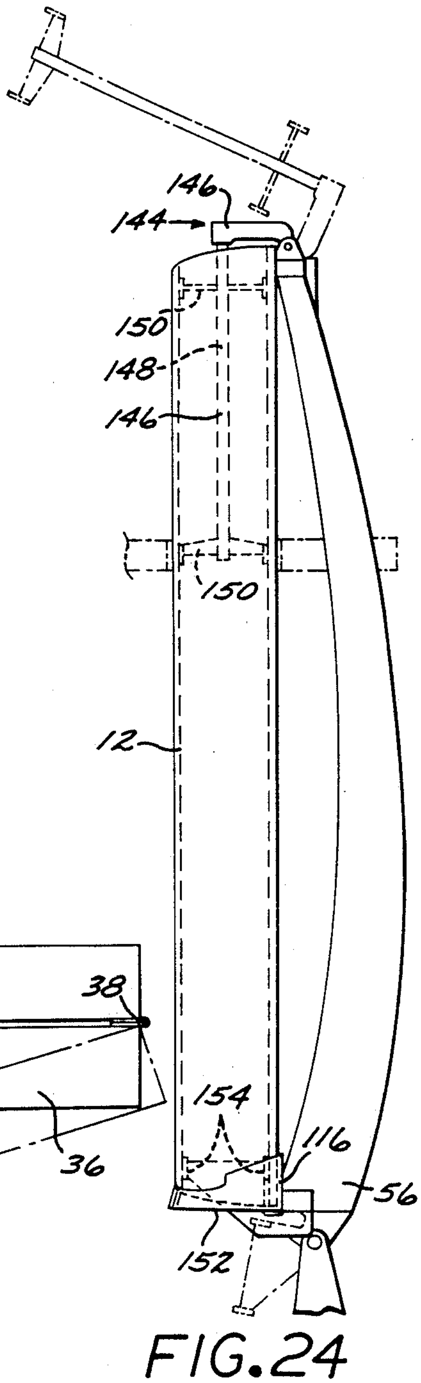
FIG. 24 is a fragmentary side elevational view of another embodiment of the release mechanism of the present invention.

Referring to FIG. 24, an upper inside retaining member 144 may be pivotally mounted to the support ring 28 to engage the inside surface of the rolled, stowed reflector shell. The upper inside retaining member includes an extension arm 146, pivotally mounted to the support ring, extending outward, generally perpendicular relative to the plane of the support ring. An insertion arm 148 extends outward from the extension arm 146, generally parallel to the plane of the support ring 28. Extending from the insertion arm 148 are engaging arms 150 positioned to engage the inside surface of the reflector shell in the stowed or rolled configuration.

Positioned substantially opposite from the upper inside retaining member 146 is a lower inside retaining member 152, pivotally mounted to the support ring 28 or central support rib 56. As with the upper retaining inside member, the lower member 152 has engaging portions 154 positioned to engage the inside surface of the reflector shell while in the stowed or rolled configuration.

In operation, the reflector shell 12 is placed within the lower outside support assembly 116 and the upper outside support member 14 and about the inside support or retaining assembly 144 in the stowed semi-cylindrical configuration. The support ring 28 is hinged and closed into its stowed configuration such that the jaws 100 are closed about the central support rib 56 and the folded support ring 28, and the stowed reflector shell 12. The separation bolts 112 are placed within the separation bolt bores 106 to engage the distal ends of the jaws and retain the assembly in the stowed configuration as best shown in FIG. 12. When deployment is desired, the separation bolt is blown apart to release the jaws outward by the biasing of the torsion springs 114. As a result, the vertical and longitudinal guides of FIGS. 6 and 7, already engaged with the reflector shell while in the stowed configuration, urge the reflector shell downward and longitudinally into or against the reference surface 18 of the support ring 28. Thus the support 16 and reflector shell 12, and the adjacent underlying structure, upon the release from the jaws, will fall away from the space vehicle 11 and into a desired position, from the stowed position. The vertical and longitudinal guide assemblies thereafter urge the reflector shell into engagement along the reference edge of the periphery of the support ring and, as a result of the principles earlier described, the reflector shell will configure itself to the surface contour of the support assembly and thus achieve the desired three-dimensional surface configuration. Other forms of retaining the rolled reflector shell have been described above, but each of these embodiments incorporates retaining means that prevent the unrolling of the reflector until deployment of the antenna is desired.

From the above it may be seen that the present invention provides a deployable reflector that provides an accurate reflector surface useful for high frequency electromagnetic waves while being capable of being stowed in a relatively small, light and robust package prior to deployment. The invention is capable of being used in a variety of environments and is useful for a variety of sizes and applications for such reflectors, while avoiding many of the limitations inherent in previous antenna designs.

While particular forms of the present invention have been illustrated and described in some detail, with particular reference to a reflector for use aboard a spacecraft, those skilled in the art will appreciate that various modifications may be made without departing from the spirit and scope of the invention. Accordingly, it is not intended that the invention be limited except by the appended claims.

What is claimed is:

1. A reflector assembly to focus electromagnetic waves, said reflector assembly being capable of being released from stowed configuration to a deployed configuration, said reflector assembly comprising:

flexible reflector means for focusing said electromagnetic waves, said reflector means incorporating a desired surface contour in its deployed configuration for focusing said electromagnetic waves, said reflector means having an edge;

support means positioned adjacent said reflector means, said support means providing a reference edge capable of supporting said reflector in substantially the same contour as the desired surface contour of the reflector means in its deployed configuration, said support means further comprising a support ring pivotally mounted to an underlying structure for movement of said reflector assembly from its stowed configuration to its deployed configuration;

registration means interposed between said support means and said flexible reflector means for aligning said reflector means upon said support means;

restraining means sized to maintain said flexible reflector means in said stowed configuration and deploying said reflector means from said stowed configuration to the deployed configuration; and guide means, engaged with said reflector means, for urging said flexible reflector means into said deployed configuration, whereby said restraining means releases said flexible reflector means from said stowed configuration and said registration means aligns said edge of said reflector means against said reference edge of said support means so that said reflector means deploys to said deployed configuration having the desired surface contour for focusing said electromagnetic waves.

2. A reflector assembly as set forth in claim 1, wherein said reflector means is formed of material having a high resistance to distortion by tensile and compressive forces and a comparatively low resistance to distortion by torsional and bending forces.

3. A reflector assembly as set forth in claim 1, wherein said reflector means and said support means have opposed mating surfaces and wherein said registration means further comprises:

a strip of magnetic material mounted on one of such opposed mating surfaces and a magnet mounted on the opposite mating surface.

4. A reflector assembly as set forth in claim 1 wherein said flexible reflector means comprises a unitary reflector shell.

5. A reflector assembly as set forth in claim 1 wherein said support ring has a circumference and wherein said support means further comprises:

a rib extending across said support ring from one portion of said circumference to another.

6. A reflector assembly as set forth in claim 5, wherein said underlying structure further comprises:

a reflector mounting bracket projecting outward therefrom, and said restraining means includes an upper support member having a proximal end relative to said underlying structure and pivotally mounted to said underlying structure to move about a substantially longitudinal axis from a closed position to an open position, said upper support positioned to grasp said reflector means distal from said proximal end, and a lower support member mounted upon said mounting bracket and positioned to engage with said reflector means.

7. A reflector assembly as set forth in claim 6, wherein said upper support member further comprises:

a plurality of jaws having opposite inward facing engaging surfaces, said inward facing engaging surfaces further having recesses formed therein, said recesses positioned to define a bore sized to receive said reflector means in said stowed configuration between said plurality of jaws, when said reflector is in said stowed position.

8. A reflector assembly as set forth in claim 7, wherein said upper support further comprises:

securing means for clamping said jaws in said closed position and a torsion means, for outwardly biasing said jaws relative to each other, wherein a separation means releasably engages said jaws adjacent to one another in said closed position and releases said jaws upon activation from a remote location to enable them to move outward relative each other to release said flexible reflector shell from said stowed configuration.

9. A reflector assembly to focus electromagnetic waves for mounting to an underlying structure, said reflector assembly being remotely released from a stowed configuration to a deployed configuration, said reflector assembly comprising;

a flexible reflector shell having a focusing surface on the first side of said shell and a support surface on the second side of said shell, said focusing surface having a desired surface contour in its deployed configuration for focusing said electromagnetic waves and being formed of a material having a substantially greater resistance to distortion by tensile and compressive forces than resistance to distortion by torsional and bending forces;

a support ring, said support ring having a supporting surface matching with said second side of said reflector, said supporting surface including a reference edge with a circumferential configuration and surface contour substantially the same as said second side of said reflector shell contour;

a support rib extending across said support ring, said support rib having a top surface contour adjacent said second side of said reflector shell configured to conform with the desired surface contour of the deployed reflector shell and having a mounting fitting at one end for pivotal mounting of said support rib and support ring to said underlying structure;

a first magnetic registration strip mounted on said second side of said flexible reflector shell;

a second magnetic registration strip positioned and mounted upon the circumference of said support ring to cooperate with a said first magnetic registration strip;

a restraining support positioned adjacent said support ring for selectively restraining said flexible reflector shell in a stowed configuration, an upper portion of said restraining support having a plurality of jaws pivotally mounted to said support ring and secured to one another to define a bore sized to receive said flexible reflector means while in said stowed configuration;

a longitudinal guide mechanism comprising a substantially longitudinal guide surface formed in said support rib, a first engaging member secured to the second side of said reflector and in engagement with the longitudinal guide surface and means for biasing the first engaging member along the longitudinal guide surface from a position corresponding the reflector's stowed configuration to the reflector's deployed configuration; and a vertical guide mechanism comprising a substantially vertical guide surface formed in said support rib, a second engaging member secured to said second side of said reflector and in engagement with the vertical guide surface and means for biasing the second engaging member along the vertical guide surface from a position corresponding to the reflector's stowed configuration to the reflector's deployed configuration, whereby the restraining support assembly releases the flexible reflector from the stowed configuration, allowing the reflector to expand out into a generally planar configuration, retained by said magnetic strips over the support ring while said longitudinal and said vertical guide mechanisms urge the generally planar flexible reflector into a three dimensional shape conforming to the desired surface contour by the biasing action of said longitudinal and said vertical guide mechanisms so that said deployed reflector assumes the desired surface contour as its is juxtaposed against said support ring and said support arm in its deployed configuration.

10. A reflector assembly as set forth in claim 9, wherein said support ring further comprises:

a plurality of wing portions and a central portion, said wing portions pivotally mounted to said central portion on opposite sides thereto.

11. A reflector assembly as set forth in claim 10, wherein said support ring further comprises:

a plurality of hinges mounted between said wing portions and said central portion upon a first surface;

biasing means mounted on the side opposite the hinge extending from each wing portion to the central portion, for urging said wing portion from a nonplanar to a planar configuration;

and latch means for engaging said wing portions to said central portion after return to the planar configuration by said biasing means.

12. A deployable reflector which comprises:

a reflector, said reflector having high in-plane rigidity and comparatively low out of plane rigidity referenced to the aperture plane of said reflector;

support means for said reflector, said support means further comprising a frame underlying said reflector, said frame providing means to index the edges of said reflector and support said reflector in the out of plane direction;

means to retain said reflector in a stowed state in which said reflector is deformed about an axis parallel to a diameter of said reflector into an essentially cylindrical envelope; and means to remotely release said stowed reflector, whereby said reflector assumes its original shape and configuration by release of energy stored in said reflector by previous deformation into the stowed configuration.

13. The deployable deflector of claim 12 wherein said support frame further comprises:

a folding frame, said folding frame having a relatively small folded envelope compared to its unfolded envelope.

14. A stowable reflector assembly for accurately focusing electromagnetic energy upon deployment, said assembly comprising;

flexible reflector means having a single contiguous surface of highly accurate focusing geometry when in a deployed state and capable of being reversibly constrained into a folded-up, generally cylindrical configuration for stowage, said reflector means having a peripheral edge;

support means having a reference edge for engaging the entire peripheral edge of said reflector means upon deployment;

registration means for aligning the peripheral edge of said reflector means with the reference edge of said support means upon deployment;

means for releasably retaining said flexible reflector in its constrained, rolled-up configuration directly above said support means, whereby, upon release, the reflector means unrolls to engage the reference edge of the support means by its peripheral edge, as properly aligned by the registration means, to provide the deployed reflector.

15. The reflector assembly of claim 14 further comprising means for folding said support means into a compact form for stowage and means for unfolding said support means just prior to deployment of said reflector means.

16. The reflector of claim 14 wherein the highly accurate focusing geometry of said reflector in its deployed state describes a paraboloid.

* * * * *